(12) United States Patent
Choi et al.

(10) Patent No.: US 7,459,235 B2  
(45) Date of Patent: Dec. 2, 2008

(54) ANODE COMPOSITION FOR LITHIUM BATTERY, AND ANODE AND LITHIUM BATTERY USING THE SAME

(75) Inventors: Young-Min Choi, Osan-si (KR); Kyung-Ho Kim, Cheonan-si (KR); Ungyu Paik, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 817 days.

(21) Appl. No.: 10/870,993

(22) Filed: Jun. 21, 2004

(65) Prior Publication Data

US 2004/0258991 A1    Dec. 23, 2004

(30) Foreign Application Priority Data

Jun. 20, 2003   (KR) .................... 10-2003-0040085

(51) Int. Cl.  
*H01M 4/62*    (2006.01)

(52) U.S. Cl. .................... 429/217; 429/212; 429/231.8; 429/218.1; 429/225; 429/229; 429/231.5; 429/231.6; 429/231.95; 429/219

(58) Field of Classification Search ................ 429/217, 429/212, 231.8, 218.1, 225, 229, 231.5, 231.6, 429/231.95, 219  
See application file for complete search history.

(56) References Cited

U.S. PATENT DOCUMENTS

| | | | |
|---|---|---|---|
| 5,380,606 A | 1/1995 | Itou | ............................ 429/194 |
| 5,501,548 A | 3/1996 | Hayashi | ........................ 405/143 |
| 5,525,444 A | 6/1996 | Ito et al. | |
| 5,635,151 A | 6/1997 | Zhang | .......................... 423/445 |
| 5,721,069 A | 2/1998 | Shoji et al. | |
| 5,837,015 A | 11/1998 | Venugopal | .................. 29/623.2 |
| 6,335,114 B1 | 1/2002 | Ueshima et al. | |
| 6,682,857 B2 * | 1/2004 | Takezawa et al. | ........... 429/345 |

FOREIGN PATENT DOCUMENTS

| | | | |
|---|---|---|---|
| EP | 0778630 A1 | | 6/1997 |
| EP | 0817294 A1 | | 1/1998 |
| JP | 4-255670 | | 9/1992 |
| JP | 4-255760 | | 9/1992 |
| JP | 5-74461 | | 3/1993 |
| JP | 2002-050360 | * | 2/2002 |
| JP | 2002-304986 | * | 10/2002 |

* cited by examiner

*Primary Examiner*—Laura S Weiner  
(74) *Attorney, Agent, or Firm*—H.C. Park & Associates, PLC

(57) ABSTRACT

Provided are an anode composition for a lithium battery, and an anode and a lithium battery using the same. The anode composition can improve anode and battery characteristics while using water as a solvent that is harmless to humans. The anode composition includes an anode active material, a synthetic rubber binder, a cellulose-based dispersing agent, and a water-soluble anionic polyelectrolyte.

10 Claims, 1 Drawing Sheet

ANODE COMPOSITION FOR LITHIUM BATTERY, AND ANODE AND LITHIUM BATTERY USING THE SAME

BACKGROUND OF THE INVENTION

This application claims the benefit of Korean Patent Application No. 2003-40085, filed on Jun. 20, 2003, in the Korean Intellectual Property Office, which is herein incorporated by reference.

1. Field of the Invention

The present invention relates to lithium batteries generally. More particularly, the present invention relates to an anode composition for a lithium battery that can improve anode characteristics and battery characteristics while using water as a solvent, and to an anode and lithium battery using the same.

2. Description of the Related Art

Recently, as portable electronic devices such as personal data assistants (PDAs) cellular phones, and notebook computers have become widely used in various areas, batteries for driving these electronic devices have become smaller, thinner, and lighter, and offer improved performance.

Due to advantages such as light weight and high energy density, lithium batteries are used as main driving sources for many portable electronic devices. Like all batteries, lithium batteries have an anode and a cathode, each formed of an electrically active material. The active material used to form cathodes (hereinafter, cathode active material) may be a lithium-containing transition metal oxide such as $LiCoO_2$ and $LiNiO_2$ or a chalcogen compound such as $MoS_2$. These compounds allow reversible intercalation or de-intercalation of lithium ions because of their layered crystalline structure, and thus, have been widely used as a cathode active material in lithium batteries.

An active material used to form anodes (hereinafter, anode active material) in lithium batteries is lithium metal. However, when lithium metal is subjected to intercalation and de-intercalation during a charge/discharge cycle of lithium batteries, needle-shaped lithium dendrites are sometimes repeatedly precipitated on the surface of the anode. These needle-shaped lithium dendrites may not only decrease the battery's charge/discharge efficiency but also can contact a cathode, thereby causing an internal short-circuit.

In view of these problems, alternative anode active materials have been suggested. Examples include: a lithium alloy, a metal powder, a carbonaceous material such as a graphite, a metal oxide, or a metal sulfide that enables reversible lithium intercalation/de-intercalation. However, when a charge/discharge cycle is repeated in lithium batteries that use a lithium alloy sheet as an anode, the efficiency of current collection may be lowered due to pulverization of the alloy sheet, thereby deteriorating the battery's charge/discharge cycle characteristics.

Due to these disadvantages, a sheet anode cannot be formed solely of a metal powder, a carbonaceous material, a metal oxide, or a metal sulfide. Thus, a binder is generally added. For example, an operable anode may be made of a mixture of a carbonaceous anode active material and an elastic, rubber-based, polymer binder.

When metal oxide or metal sulfide is used as a base anode active material, a conductive material can be used in addition to a binder to enhance the battery's charge/discharge characteristics. Generally, a carbonaceous material for an anode is crushed into powder and mixed with a binder to form an anode plate. Then a rubber-based polymer is used as a binder to coat the carbonaceous material particles, but this renders the intercalation and de-intercalation reaction of lithium ions difficult. As a result, the high efficiency discharge characteristics of lithium batteries are remarkably reduced.

Another drawback is that use of only a conventional binder in the absence of other additives provides poor adhesion between a carbonaceous material and a metal substrate made of a metal, regardless of the type and shape of the carbonaceous material used. To compensate, a large amount of a binder is required. The carbonaceous material may be covered with the binder, but this decreases the battery's high efficiency discharge characteristics. On the other hand, if the binder is used in a small amount to maintain discharge characteristics, an anode active material layer may be separated from the substrate. However, such a configuration renders formation of a sheet anode difficult and increases the chances of forming a poor anode plate. In this regard, attention has been focused on the search for an alternative method to increase adhesion between a carbonaceous anode active material and a substrate while avoiding excess use of a binder in lithium batteries. One previously-attempted solution discloses a mixed binder for an anode including a polyamic acid and at least one polymer selected from the group consisting of a polyamide resin, polyvinylpyrrolidone, and hydroxyalkyl-cellulose to ensure a long lifecycle and enhance reliability.

However, since the polyamic acid for the mixed binder must be removed by thermal treatment at 200 to 400° C. during drying of the anode plate, the manufacturing process is complicated and the physical properties of the anode may change during manufacture. Thus, a mixed binder of polyvinylpyrrolidone and styrene butadiene rubber (SBR) has been suggested as an alternative binder material for an anode. However, use of the mixed binder may lower uniformity of the anode due to an adhesion strength difference between the two materials, and cause separation of an anode active material during a charge/discharge cycle or make solid components loose.

Additionally, binders for manufacture of an anode composition usually need an organic solvent such as N-methyl-2-pyrrolidone (NMP) that is harmful to humans. Therefore, there arise problems in that the anode manufacturing process is complicated, because multi-step processes and apparatuses are required, and because environmental contamination due to emission of contaminants, such as organic solvents, occurs. In an attempt to solve these problems, one method proposed preparing a slurry of aqueous anode active material, the slurry containing water as a solvent together with a water-soluble SBR binder. A drawback of this approach, however, is that use of a small quantity of only the SBR based binder may cause a decrease in adhesion and anode characteristics as described above, because the SBR binder has weak adhesion due to its point contact adhesive properties and small contact area with the active material. Consequently, use of only an SBR binder may cause separation of the active material from an electrode plate or decrease an adhesion between active materials. Thus, use of only a SBR binder may decrease the charge/discharge cycle characteristics of lithium batteries.

SUMMARY OF THE INVENTION

The present invention provides an aqueous anode composition for a lithium battery. The aqueous anode composition of the present invention is environmentally friendly and offers improved slurry dispersability, as well as improved adhesion between one or more anode active materials and an anode plate. Additionally, the present invention provides an anode formed of the anode composition. The present invention also provides a lithium battery using the anode formed of the invention's aqueous anode composition.

DETAILED DESCRIPTION OF THE INVENTION

Figure 1:
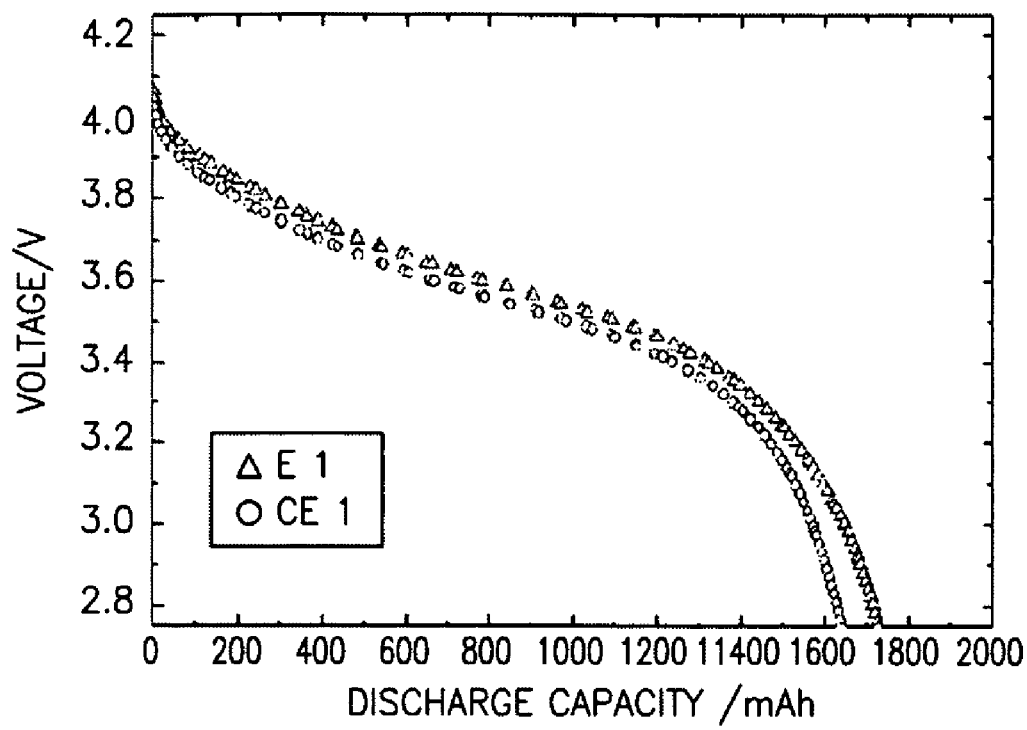
FIG. 1 is a graph that illustrates low temperature discharge capacity characteristics of lithium secondary batteries using anodes manufactured in accordance with Example 1 and Comparative Example 1.

A lithium battery with improvements in anode characteristics and battery performance, in particular, a high energy density and excellent low temperature capacity characteristics and cycle characteristics is provided. For example, in one embodiment, a water-soluble anionic polyelectrolyte is added to an aqueous anode composition using water as a solvent, thereby enhancing slurry dispersability and an adhesion between the anode active material and an anode plate.

In one embodiment, a synthetic rubber binder, water, a cellulose-based dispersing agent, and a water-soluble anionic polyelectrolyte are mixed with an anode active material to prepare an anode composition to be used in manufacturing a lithium battery. Since the anode composition containing the water-soluble anionic polyelectrolyte can be more efficiently dispersed than in conventional methods, the adhesion between an anode active material and an anode plate as well as the amount of anode active material in an anode are increased. The increased adhesion and increased amount of anode active material makes it possible to manufacture a lithium battery with excellent battery characteristics.

The anode active material, which is a component for an anode composition according to one embodiment of the present invention, may be, but is not limited to, a carbonaceous material such as a natural graphite, an artificial graphite, coke, or carbon fiber. Alternatively, the anode active material may be a compound containing one or more selected from the group consisting of Al, Si, Sn, Ag, Bi, Mg, Zn, In, Ge, Pb, and Ti which can form a Li based alloy. In another embodiment, the anode active material may be a complex compound of the carbonaceous material and the compound containing one or more selected from the group consisting of Al, Si, Sn, Ag, Bi, Mg, Zn, In, Ge, Pb, and Ti. In yet another embodiment, the anode active material is a lithium-containing nitride.

The anode active material performs an important function related to battery performance, and should occupy most of an anode composition in order to enhance battery performance. As used herein, the anode active material is used in an amount of 90 to 99% by weight, based on the total amount of an anode composition. If the amount of the anode active material is less than 90% by weight, battery performance may be lowered due to a shortage of the anode active material. On the other hand, if it exceeds 99% by weight, dispersability and adhesion of the anode active material may deteriorate.

There are no limitations on an anode current collector for the lithium battery provided that it is an electrical conductor that does not generate a chemical reaction in the lithium battery. Illustratively, the anode current collector may be made of stainless steel, nickel, copper, titanium, or a copper alloy. Alternatively, it may be made of copper or stainless steel covered with carbon, nickel, titanium, or silver.

In one embodiment, the water-soluble anionic polyelectrolyte contained in the aqueous anode composition is a polymer compound having a dissociation group on its polymer chain or a compound having characteristics similar to the polymer compound. In other words, the water-soluble anionic polyelectrolyte is a compound which carries a negative charge in its molecule when the dissociation group (for example, a sodium ion or a hydrogen ion) is dissociated in a solvent such as water. Embodiments of the present invention use a water-soluble anionic polyelectrolyte to enhance dispersability via the electrical repulsion interaction between negatively charged particles in the anode composition. Examples of a suitable water-soluble anionic polyelectrolyte include citric acid, citrates, tartaric acid, tartrates, succinic acid, succinates, poly(meth)acrylic acid, poly(meth)acrylates, and a mixture thereof. To increase solubility in water, the water-soluble anionic polyelectrolyte may be a Na or $NH_4$ salt thereof.

In various embodiments, the water-soluble anionic polyelectrolyte may be used in an amount of approximately 0.1 to 4.0% by weight, preferably, 0.2 to 2.0% by weight, based on the total amount of the anode composition. If the amount of the water-soluble anionic polyelectrolyte is less than about 0.1% by weight, a sufficient addition effect may not be obtained. On the other hand, if it exceeds about 4% by weight, viscosity may increase without further enhancement of dispersability, which may not be suitable for preparation of the slurry of anode active material.

The synthetic rubber binder contained in the anode composition for a lithium battery of the present invention may be, for example: styrene butadiene rubber, nitrile butadiene rubber, methyl(meth)acrylate butadiene rubber, chloroprene rubber, carboxy modified styrene butadiene rubber, modified polyorganosiloxane polymer, or a mixture thereof.

A synthetic rubber binder used together with the water-soluble anionic polyelectrolyte, reduces delamination of the anode active material and internal short-circuiting caused by poor adhesion of an anode active material. In this manner, a lithium battery's charge/discharge cycle characteristics are enhanced. Furthermore, the amount of anode active material increases, due to good dispersability of the aqueous anode composition, which makes it possible to manufacture a lithium battery with high energy density and good safety.

The synthetic rubber binder may be used in an amount of approximately 0.1 to 4.0% by weight, preferably about 1.0 to 3.0% by weight, based on the total amount of the anode composition. If the amount of the synthetic rubber binder is less than about 0.1% by weight, an anode active material may peel off the anode current collector. This renders the fabrication of a sheet anode difficult and increases the likelihood of forming a poor quality anode. On the other hand, if it exceeds about 4.0% by weight, the anode may be covered by the synthetic rubber binder, which increases the anode's internal resistance and lowers the efficiency of the battery's discharge capacity.

In one embodiment, the cellulose-based dispersing agent contained in the anode composition is: carboxymethylcellulose, carboxyethylcellulose, aminoethylcellulose, oxyethylcellulose, or a mixture thereof. To increase solubility in water, the cellulose-based dispersing agent may be a Na or $NH_4$ salt thereof.

In one illustrative example, the cellulose-based dispersing agent is used in an amount of approximately 0.1 to 4.0% by weight, preferably about 1.0 to 3.0% by weight, based on the total amount of the anode composition. If the amount of the cellulose-based dispersing agent is less than about 0.1% by weight, the viscosity of the anode composition may be too low, which renders casting difficult. On the other hand, if it exceeds about 4.0% by weight, the viscosity of the anode composition increases, and the slurry of anode active material may not be suitable as a coating material. To counteract this problem, it may be necessary to reduce the amount of the anode active material. However, decreasing the amount of anode active material may deteriorate anode characteristics.

To manufacture a high capacity lithium battery, the amount of an active material per unit weight or unit volume should be as high as possible. In an embodiment of the present invention, addition of a water-soluble anionic polyelectrolyte to the anode composition enhances dispersability of the anode composition (e.g. causes a greater amount of active material to be deposited). The increased amount of active material in the anode composition, in turn enhances the performance of the lithium battery.

To provide enhancements in binder adhesion and dispersability of the active material, one exemplary embodiment of the present invention uses a synthetic rubber binder together with a water-soluble anionic polyelectrolyte and a cellulose-based dispersing agent. This results in a lithium battery having enhanced performance.

A method for manufacturing a lithium battery according to an embodiment of the present invention will now be described in detail.

First, a cathode plate is prepared according to a method commonly used in the manufacturing of a lithium battery. For this, a cathode active material and a binder are dissolved in a solvent. A plasticizer or a conductive material is further added to the resultant mixture to prepare a cathode composition. An aluminium foil is then coated with the cathode composition and dried to prepare the cathode plate. The cathode active material may be one or more materials selected from the following: lithium metal composite oxide, elemental sulfur, kasolite in which $Li_2S_n(n \geq 1)$ is dissolved, an organic sulfur, and $(C_2S_x)_y$ where x is 2.5-20 and $y \geq 2$.

The anode plate according to the present invention may be prepared by a method illustrated in Example 1, described below.

Now, a preparation method of an electrolyte used in the preparation of the present invention will be explained.

A lithium salt contained in an electrolyte as used herein is not particularly limited provided that it can be dissociated into a lithium ion in an organic solvent. For example, the lithium salt may be at least one lithium salt selected from the following: lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), and lithium bistrifluoromethanesulfonylamide ($LiN(CF_3SO_2)_2$). In one embodiment, the concentration of the lithium salt is in a range of about 0.5 to 2.0 Mols. If the concentration of the lithium salt is outside the indicated range, ionic conductivity may be insufficient. An organic electrolyte containing such an inorganic salt allows lithium ions to move between a cathode and an anode.

An organic solvent contained in an electrolyte used in embodiments of the invention described herein may be one or more selected from the following: a polyglyme compound, a dioxolane compound, a carbonate compound, 2-fluorobenzene, 3-fluorobenzene, 4-fluorobenzene, dimethoxyethane, and diethoxyethane.

The polyglyme compound may be one or more selected from the following: di(ethyleneglycol)dimethyl ether, di(ethyleneglycol)diethyl ether, tri(ethyleneglycol)dimethyl ether, and tri(ethyleneglycol)diethyl ether.

The dioxolane compound may be one or more selected from the following: 1,3-dioxolane, 4,5-diethyl-dioxolane, 4,5-dimethyl-dioxolane, 4-methyl-1,3-dioxolane, and 4-ethyl-1,3-dioxolane.

The carbonate compound may be one or more selected from the following: methylene carbonate, ethylene carbonate, propylene carbonate, diethyl carbonate, dimethyl carbonate, gamma-butyrolactone, dimethyl carbonate, methylethyl carbonate, diethyl carbonate, and vinylene carbonate.

In one embodiment, the organic solvent is a mixture of ethylene carbonate (EC), ethylmethyl carbonate (EMC), propylene carbonate (PC), and fluorobenzene (FB); or a mixture of diglyme (DGM), dimethoxyethane (DME), and 1,3-dioxolane (DOX).

The amount of organic solvent used may be an amount commonly used in a lithium battery.

The lithium battery according to the present invention may be manufactured using any one of common methods known to a person of ordinary skill in the art, provided, of course that the cathode plate, anode plate, and electrolyte are manufactured as explained and described above.

For example, a lithium battery may be manufactured according to following non-limiting three methods. Other methods may be used. However, three illustrative methods are described. In one method, an electrode assembly comprising an anode, a separator, and a cathode is encased in a battery case, followed by addition of an electrolyte manufactured as described above. In another method, a polymer resin for matrix formation is mixed with an electrolyte of the present invention to form a polymer electrolyte composition, the polymer electrolyte composition is coated on an electrode or a separator to form an electrode assembly, and then the electrode assembly is encased in a battery case to manufacture a lithium battery. In yet another method using a prepolymer or a polymerizable monomer as a polymer resin for matrix formation, a polymer electrolyte composition containing the prepolymer or the polymerizable monomer and an electrolyte of the present invention is coated on an electrode or a separator to form an electrode assembly and the electrode assembly is then encased in a battery case, which is then heated or irradiated with an actinic ray to polymerise the prepolymer or the polymerizable monomer to manufacture a lithium battery.

In general, there are no particular limitations on the separator used in the above methods provided that it is used in a lithium battery. However, in one embodiment, a separator with low resistance to electrolytic ion mobility and good electrolyte retention capacity is used. In another embodiment, a non-woven or woven separator made of a glass fiber, polyester, teflon, polyethylene(PE), polypropylene(PP), polytetrafluoroethylene (PTFE), PE/PP, PE/PP/PE, PP/PE/PP or a mixture thereof is used. Alternatively, the separator may be a polyethylene and/or polypropylene porous film which is slightly reactive with an organic solvent and thus safer.

The polymer resin for matrix formation used in the above methods is not particularly limited. Any binder material used for an electrode plate may be used, for example, a vinylidene-fluoride/hexafluoropropylene copolymer, polyvinylidenefluoride, polyacrylonitrile, polymethylmethacrylate, or a mixture thereof.

The polymer resin for matrix formation may further include a filler such as silica, kaolin, and alumina, to increase the mechanical strength of the polymer electrolyte. The polymer resin for matrix formation may further include a plasticizer.

As used herein, there are no particular limitations on the type of a lithium battery containing an electrolyte. For example, a primary battery, a secondary battery, and a lithium sulfur battery can be used.

As used herein, there are no particular limitations on the shape of a lithium battery containing an electrolyte manufactured in accordance with the present invention. For example, a prismatic type lithium battery and a cylindrical lithium battery can be used.

Hereinafter, the present invention will be described more specifically by Examples and Comparative Examples. However, the following Examples are provided only for illustrations and thus the present invention is not limited to or by them.

EXAMPLE 1

97% by weight of a natural graphite, 1.0% by weight of carboxymethylcellulose (CMC), 1.0% by weight of styrene butadiene rubber (SBR), and 1.0% by weight of poly(methacrylic acid) (Aldrich) were added in water and ball-milled with a ceramic ball for about 10 hours. The mixture was cast with a 300 μm doctor blade onto a copper foil and dried in about 90 μm oven for about 10 hours to obtain an anode plate. The anode plate was roll-pressed and cut into a predetermined size to obtain an anode plate sample with a thickness of 120 μm.

EXAMPLE 2

An anode plate sample was prepared in the same manner as in Example 1 except that 97% by weight of a natural graphite, 1.0% by weight of CMC, 1.0% by weight of SBR, and 1.0% by weight of poly(acrylic acid)(Aldrich) were added to water.

EXAMPLE 3

An anode plate sample was prepared in the same manner as in Example 1 except that 95% by weight of a natural graphite, 2.0% by weight of CMC, 2.0% by weight of SBR, and 1.0% by weight of poly(methacrylic acid)(Aldrich) were added to water.

EXAMPLE 4

An anode plate sample was prepared in the same manner as in Example 1 except that 96% by weight of a natural graphite, 1.5% by weight of CMC, 1.0% by weight of SBR, 0.9% by weight of citrate, and 0.6% by weight of tartaric acid(Aldrich) were added to water.

EXAMPLE 5

An anode plate sample was prepared in the same manner as in Example 1 except that 97% by weight of a natural graphite, 1.0% by weight of CMC, 1.0% by weight of SBR, and 1.0% by weight of poly(acrylic acid, sodium salt)(Aldrich) were added to water.

EXAMPLE 6

An anode plate sample was prepared in the same manner as in Example 1 except that 97% by weight of a natural graphite, 1.0% by weight of CMC, 1.0% by weight of methylmethacrylate butadiene rubber, and 1.0% by weight of poly(methacrylic acid) (Aldrich) were added to water.

COMPARATIVE EXAMPLE 1

An anode plate sample was prepared in the same manner as in Example 1 except that 97% by weight of a natural graphite, 1.5% by weight of CMC, and 1.5% by weight of SBR were added to water.

COMPARATIVE EXAMPLE 2

An anode plate sample was prepared in the same manner as in Example 1 except that 98% by weight of a natural graphite, 1.0% by weight of CMC, and 1.0% by weight of SBR were added to water.

Preparation 1: Lithium Batteries

96% by weight of $LiCoO_2$, 2% by weight of poly(vinylidene fluoride) (PVDF) as a binder, and 2% by weight of carbon black (Product name: Super-P) as a conductive agent were mixed and 100 ml of N-methylpyrrolidone (NMP) were added thereto. The resultant mixture was ball-milled in 200 ml of a plastic bottle with a ceramic ball for 10 hours, cast with 250 μm doctor blade onto an aluminium foil with a thickness of 15 μm, and dried in about 110° C. oven for about 12 hours to completely evaporate NMP. Then, the resultant cathode plate was roll-pressed and cut into a predetermined size to obtain a cathode plate sample with a thickness of 95 μm.

A polyethylene/polypropylene porous film (Celgard Inc.: Product#: 2300) with a thickness of 20 μm was used as a separator.

The porous film was interposed between the cathode plate sample and each of the anode plate samples according to Examples 1 through 6 and Comparative Examples 1 and 2 and spirally wound to obtain battery assemblies with a jelly roll structure. Then, the battery assemblies were encased in cylindrical battery cases and a non-aqueous electrolyte was injected in the cylindrical battery cases followed by sealing to complete 1,800 mAh grade lithium secondary batteries.

At this time, 5.3 g of a mixed organic solvent of ethylene carbonate (EC), ethylmethyl carbonate (EMC), propylene carbonate (PC), and fluorobenzene (FB) (EC/EMC/PC/FB=30/55/5/10, in volume ratio) containing 1.1M $LiPF_6$ was used as the non-aqueous electrolyte.

Evaluation 1: Discharge Capacity

Figure 2:
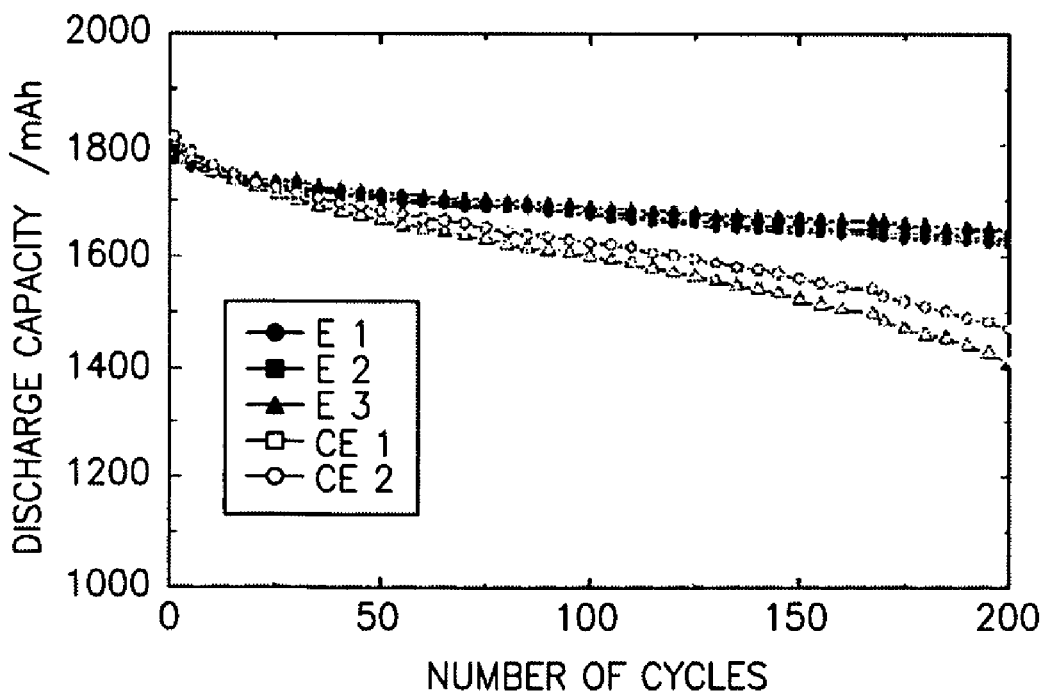
FIG. 2 is a graph that illustrates lifecycle characteristics of lithium secondary batteries using anodes manufactured in accordance with Examples 1 through 3 and Comparative Examples 1 and 2.

The discharge capacities of the lithium batteries according to Preparation 1 were evaluated at −10° Celsius using a current of 0.2 Coulomb (C) and the results are shown in FIG. 1. As seen from FIG. 1, the lithium battery using the anode plate sample of Example 1 exhibited good capacity characteristics at low temperature. This indicates that electrical characteristics of the anode plate were enhanced by the dispersability enhancing effect of polymethacrylate used as a water-soluble anionic polyelectrolyte in Example 1. In FIGS. 1 and 2, "E" denotes Example and "CE" denotes Comparative Example.

Evaluation 2: Adhesion

For adhesion evaluation, a stainless rod (4 mm in diameter) was disposed perpendicularly to the anode plate samples of Examples 1 through 6 and Comparative Examples 1 and 2 and the anode plate samples were scratched by the rod with varying a vertical weight. Vertical weights when coating films were delaminated from the copper foils were measured and the results of the delamination strengths of the coating films are presented in Table 1 below.

TABLE 1

| Samples | Adhesion strength (gf/mm) |
|---|---|
| Example 1 | 0.9014 |
| Example 2 | 0.9073 |
| Example 3 | 0.9253 |
| Example 4 | 0.9007 |
| Example 5 | 0.9373 |
| Example 6 | 0.9168 |
| Comparative Example 1 | 0.5207 |
| Comparative Example 2 | 0.5138 |

Evaluation 3: Lifecycle Characteristics

The lifecycle characteristics of the lithium secondary batteries according to Preparation 1 were evaluated and the results are shown in FIG. 2. FIG. 2 shows a change in discharge capacity when the lithium secondary batteries with a standard discharge capacity of 1,800 mAh are charged and discharged at 1 Coulomb rate during 200 cycles. As seen from FIG. 2, the lithium secondary batteries using the anode plate samples of Examples 1 through 3 maintained a discharge capacity of about 1,620 mAh or more even after 200 cycles, which was an excellent retention rate of a discharge capacity, i.e., lifecycle characteristics, as compared to those using the anode plate samples of Comparative Examples 1 and 2.

The results of FIG. 2 are presented in Table 2 below. Table 2 shows discharge capacities when the lithium secondary batteries with a standard discharge capacity of 1,800 mAh according to Preparation 1 are charged and discharged at 1C rate for 200 cycles, and percentages of the discharge capacities to the standard discharge capacity.

TABLE 2

| Samples | Discharge capacity after 200 cycles (mAh) | % of discharge capacity after 200 cycles to standard capacity (1,800 mAh) |
|---|---|---|
| Example 1 | 1,620 | 90.0 |
| Example 2 | 1,630 | 90.6 |
| Example 3 | 1,648 | 91.6 |
| Comparative Example 1 | 1,471 | 81.7 |
| Comparative Example 2 | 1,409 | 78.3 |

As seen in Table 2, the lithium secondary batteries using the anode plate samples according to Examples 1 through 3 exhibited significantly improved lifecycle characteristics after 200 cycles, as compared to those using the anode plate samples according to Comparative Examples 1 and 2. From the above results, it can be seen that an anode composition containing a water-soluble anionic polyelectrolyte has an increased adhesion strength to a substrate as shown in Table 1 above, which enhances the lifecycle and other characteristics of lithium batteries.

As apparent from the above descriptions, an anode composition for a lithium battery according to the present invention contains a water-soluble anionic polyelectrolyte, a synthetic rubber binder, and a cellulose-based dispersing agent, to enhance slurry dispersability and the adhesion to an anode plate. In this manner, anode plate delamination and internal short circuiting caused by increased internal battery resistance and decreased adhesion strength of the anode plate during a repeated charge/discharge cycle can be prevented, which results in an lithium battery having a long lifecycle. Furthermore, the anode composition of the present invention ensures an increase of an amount of anode active material in an anode. The high dispersability of the slurry of anode composition of the present invention also ensures good battery capacity characteristics at low temperature.

For example, a lithium battery of the present invention uses an aqueous anode composition that contains water as a solvent and is harmless to humans. Therefore, solvent recovery is not necessary and environmental contamination can be reduced. In addition, a lithium battery of the present invention can be efficiently used as a power source of portable electronic devices such as cellular phones, PDAs, and notebook computers, in addition to common electronic devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An anode for a lithium battery, the anode comprising:
   an anode composition that includes an anode active material, a synthetic rubber binder, a cellulose-based dispersing agent, and a water-soluble anionic polyelectrolyte, the water-soluble polyelectrolyte selected from the group consisting of citric acid, tartaric acid, succinic acid, a salt thereof, and a mixture thereof.

2. The anode of claim 1, wherein the anode active material is used in an amount of 90 to 99% by weight, the synthetic rubber binder is used in an amount of 0.1 to 4.0% by weight, the cellulose-based dispersing agent is used in an amount of 0.1 to 4.0% by weight, and the water-soluble anionic polyelectrolyte is used in an amount of 0.1 to 4.0% by weight.

3. The anode of claim 1, wherein the synthetic rubber binder is selected from the group consisting of styrene butadiene rubber, nitrile butadiene rubber, methyl(meth)acrylate butadiene rubber, chloroprene rubber, carboxy modified styrene butadiene rubber, modified polyorganosiloxane polymer, and a mixture thereof.

4. The anode of claim 1, wherein the cellulose-based dispersing agent is selected from the group consisting of carboxymethylcellulose, carboxyethylcellulose, aminoethylcellulose, oxyethylcellulose, and a mixture thereof.

5. The anode of claim 1, wherein the anode active material is a carbonaceous material selected from the group consisting of a natural graphite, an artificial graphite, coke, and carbon fiber.

6. The anode of claim 1, wherein the anode active material is a compound selected from the group consisting of Al, Si, Sn, Ag, Bi, Mg, Zn, In, Ge, Pb, and Ti.

7. The anode of claim 1, wherein the anode active material is a lithium-containing nitride.

8. The anode of claim 1, wherein the anode active material is a complex compound selected from the group consisting of Al, Si, Sn, Ag, Bi, Mg, Zn, In, Ge, Pb, and Ti.

9. A lithium battery using the anode of claim 1.

10. An anode for a lithium battery, the anode comprising:
    an anode composition that includes an anode active material, a synthetic rubber binder, a cellulose-based dispersing agent, and a water-soluble anionic polyelectrolyte, the water-soluble polyelectrolyte selected from the group consisting of citric acid, tartaric acid, succinic acid, poly(meth)acrylic acid, a salt thereof, and a mixture thereof,
    wherein the anode active material is a lithium-containing nitride.

* * * * *